United States Patent
Yoo et al.

(10) Patent No.: US 6,396,638 B1
(45) Date of Patent: May 28, 2002

(54) OPTICAL PICKUP DEVICE CAPABLE OF STABLE TRACKING

(75) Inventors: Jang-hoon Yoo, Seoul; Kun-ho Cho, Suwon; Seung-tae Jung, Seongnam; Chul-woo Lee, Seoul; Joong-eon Seo, Uiwang; Dong-ho Shin, Seongnam, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/607,928

(22) Filed: Jun. 30, 2000

(30) Foreign Application Priority Data

Jul. 8, 1999 (KR) .............................. 99-27454

(51) Int. Cl.⁷ .................. G02B 27/14; G02B 27/10; G02B 27/30; G11B 7/00
(52) U.S. Cl. .................. 359/629; 359/627; 359/637; 359/641; 369/44.11
(58) Field of Search ................. 359/629, 627, 359/637, 641, 726; 369/44.11

(56) References Cited

U.S. PATENT DOCUMENTS

| | | | |
|---|---|---|---|
| 5,088,079 A | 2/1992 | Baer | |
| 5,151,890 A | 9/1992 | Yonekubo | |
| 5,504,731 A | 4/1996 | Lee et al. | |
| 6,009,064 A | 12/1999 | Hajjar | |

FOREIGN PATENT DOCUMENTS

| | | |
|---|---|---|
| DE | 198 28 678 | 1/1999 |
| EP | 0 576 072 | 12/1993 |
| JP | 5 266532 | 10/1993 |
| JP | 6 214154 | 8/1994 |
| JP | 8 087782 | 4/1996 |
| JP | 11 126348 | 5/1999 |
| JP | 11 144278 | 5/1999 |
| JP | 2000 149316 | 5/2000 |
| JP | 2000 357335 | 12/2000 |
| WO | WO 99/27532 | 6/1999 |

*Primary Examiner*—Georgia Epps
*Assistant Examiner*—Michael A. Lucas
(74) *Attorney, Agent, or Firm*—Burns, Doane, Swecker & Mathis, L.L.P.

(57) ABSTRACT

An optical pickup device includes a light source for generating light, a light path changing means for changing the traveling path of incident light, an objective lens for focusing incident light to form a light spot on a recording medium and having an incidence region of a predetermined size, a tracking mirror disposed on the light path between the light path changing means and the objective lens, for reflecting incident light emitted from the light source so that the light spot traces proper track positions of the recording medium, a lens unit consisting of at least two lenses which allow the light reflected from the tracking mirror to be incident on the incidence region of the objective lens, and a photo detecting unit for receiving light reflected from the recording medium and having passed through the objective lens and the light path changing means. Since the optical pickup device performs tracking by adjusting the reflection direction of incident light by means of a tracking mirror with an objective lens fixed, a tracking error signal offset due to movement of the objective lens is not generated, thereby enabling stable tracking.

10 Claims, 5 Drawing Sheets

OPTICAL PICKUP DEVICE CAPABLE OF STABLE TRACKING

BACKGROUND OF THE INVENTION

1. Field of the Invention

The present invention relates to an optical pickup device, and more particularly, to an optical pickup device configured to prevent a track error signal offset to allow stable tracking.

2. Description of the Related Art

In general, an optical pickup device is configured as shown in FIG. 1 to detect a track error signal such that a beam emitted from a light source 10 tracks the proper position of a recording medium such as a disk 1 to record and/or reproduce an information signal, and is configured to control an objective lens 13 in the radial direction of the disk 1 according to the detected signal so that a light spot lands on the proper track position.

A track error signal is detected as a push-pull signal, for example, which is obtained by independently receiving light radiated from the light source 10 and reflected from the disk 1 at two light receiving regions A and B of a photodetector 15, converting the incident light into electrical signals, applying the detected signals of the light receiving regions A and B to input ports of a differential unit 17 and obtaining a difference therebetween.

Here, the light spot formed on the disk 1 by an objective lens 13 causes a 0-order diffracted beam and ±1st-order beams to interfere according to the location from the track center where it is reflected from the disk 1. Thus, the thus-obtained push-pull signal is proportional to $\sin(2\pi/tp)$ where tp designates the track pitch.

Here, reference numerals 11, 12 and 14 represent a collimating lens, a beam splitter and a light receiving lens, respectively.

The above-described conventional optical pickup device forms a light spot at the proper track position of the disk 1 by moving the objective lens 13. Thus, the light which is reflected from the disk 1 to then be incident on a photodetector 15 is also shifted as the objective lens 13 is moved, resulting in an offset to a track error signal.

SUMMARY OF THE INVENTION

To solve the above problems, it is an object of the present invention to provide an optical pickup device configured to be capable of tracking in a stable manner without moving an objective lens laterally, so as not to generate an offset in a track error signal.

To achieve the above object, there is provided an optical pickup device including a light source for generating light, a light path changing means for changing the traveling path of incident light, an objective lens for focusing incident light to form a light spot on a recording medium and having an incidence region of a predetermined size, a tracking mirror disposed on the light path between the light path changing means and the objective lens, for reflecting incident light emitted from the light source so that the light spot traces proper track positions of the recording medium, a lens unit consisting of at least two lenses which allow the light reflected from the tracking mirror to be incident on the incidence region of the objective lens, and a photo detecting unit for receiving light reflected from the recording medium and having passed through the objective lens and the light path changing means.

Here, the lens unit may include a collimating lens disposed on the light path between the light source and the objective lens, for focusing incident light emitted from the light source, and a relay lens disposed on the light path between the collimating lens and the objective lens, for convergently refracting light reflected by the tracking mirror to be incident on the incidence region of the objective lens.

In this case, the collimating lens and the relay lens are preferably provided such that incident light is focused to a point and then allowed to diverge to be incident on the relay lens.

The objective lens may include a first transmission portion forming the incidence region, for spreading incident light, a first reflection portion spaced a predetermined distance apart from the first transmission portion, for reflecting divergent incident light incident from the first transmission portion, a second reflection portion provided around the first transmission portion, for further reflecting the light reflected from the first reflection portion and focusing the same, and a second transmission portion provided at an interior or exterior side of the first reflection portion, for transmitting incident light to be focused on the recording medium.

According to one aspect of the present invention, the optical pickup device may further include a polarization prism for separating according to polarization incident light reflected from the recording medium and having passed through the objective lens and the light path changing means, the optical pickup device configured for recording on and/or reproducing from a magneto-optical recording medium such that the light path changing means comprises a partial polarized beam splitter for transmitting and reflecting a polarized light component in a predetermined ratio among incident light components and mostly transmitting or reflecting the other polarized light component, and such that the photo detecting unit comprises first and second photo detectors for receiving different polarized light components whose paths are changed by the partial polarized beam splitter and which are separated by the polarization prism.

According to another aspect of the present invention, the light path changing means may include a polarization beam splitter for transmitting and reflecting incident light according to its polarization, and a wave plate disposed on the light path between the polarization beam splitter and the objective lens, for changing the polarization of the incident light.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Figure 1:
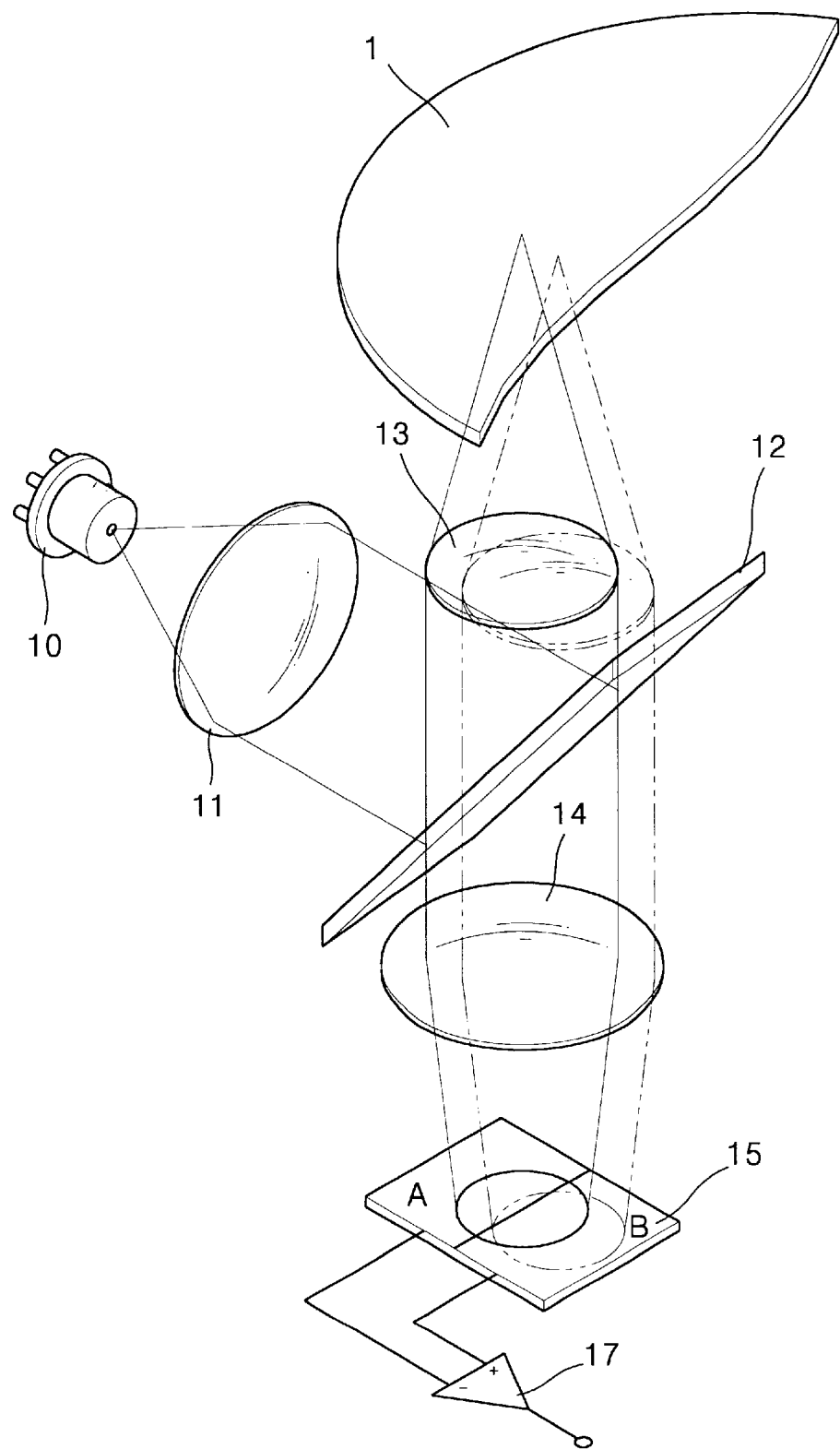
FIG. 1 is a schematic view illustrating the optical arrangement of a conventional optical pickup device.
Figure 2:
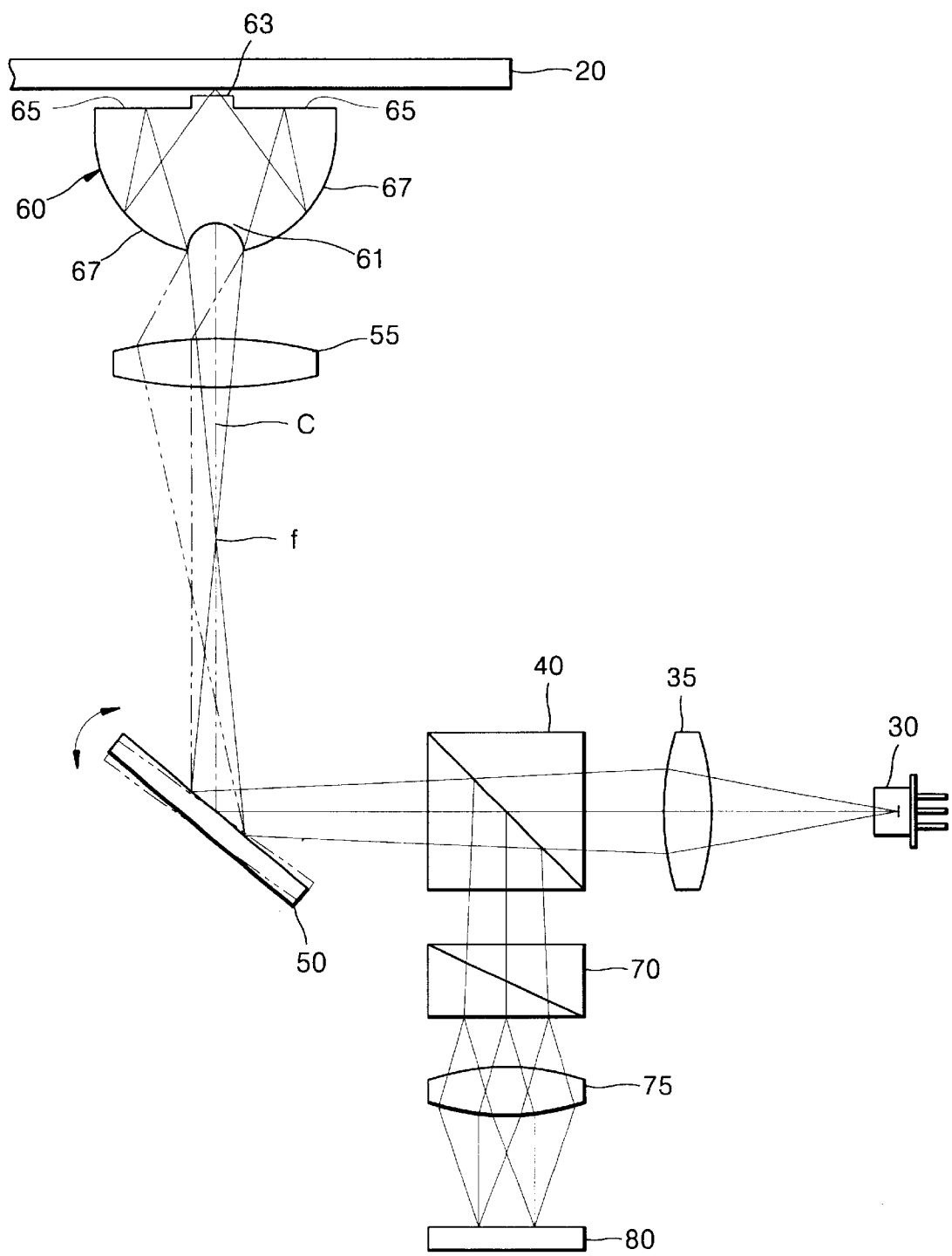
FIG. 2 is a schematic view illustrating the optical arrangement of an optical pickup device according to a first embodiment of the present invention.

Referring to FIG. 2, an optical pickup device according to an embodiment of the present invention includes a light source 30 for generating a laser beam, an objective lens 60 for focusing incident light to form a light spot on a recording medium 20, a light path changing means for changing the traveling path of incident light, a tracking mirror 50 for adjusting the reflection direction of the incident light emitted from the light source 30 so that the light spot traces the proper track positions of the recording medium 20, a lens unit consisting of at least two lenses 35 and 55, and a photo detecting unit 80 for receiving light reflected from the recording medium 20 through the objective lens 60 and the light path changing means.

The objective lens 60 includes a first transmission portion 61 for spreading incident light, a second transmission portion 63 opposed to and spaced a predetermined distance from the first transmission portion 61, a first reflection portion 65 provided around the second transmission portion 63, for reflecting light spread by the first transmission portion 61, and a second reflection portion 67 for further reflecting light reflected from the first reflection portion 65 and focusing the same.

The first transmission portion 61 has an incidence region having a predetermined size and has a concave curvature. Among divergent rays transmitted through the first transmission portion 61, some rays in a paraxial area are incident on the second transmission portion 63 opposed to the first transmission portion 61, and most remaining rays are incident on the first reflection portion 65. The first reflection portion 65 has a substantially planar reflection surface and reflects incident light from the first transmission portion 61. The second reflection portion 67 has a concave reflection surface and reflects divergent light incident from the first reflection portion 65 to be focused toward the second transmission portion 63. The second transmission portion 63 has a substantially planar surface and transmits the light in the paraxial region, incident from the first transmission portion 61 and the focused light incident from the second reflection portion 67 to form a light spot on the recording medium 20.

Here, the inside of the objective lens 60, specifically, between the first transmission portion 61 and the first reflection portion 65 and between the second reflection portion 67 and the second transmission portion 63, is made of an optical material having a refractive index greater than that of air, so that the light incident from the first transmission portion 61 and the second reflection portion 67 into the second transmission portion 63 are transmitted and refracted to then be focused.

Here, the objective lens 60 may be configured such that the first reflection portion 65 is opposed to the first transmission portion 61, the second transmission portion 63 is provided around the first reflection portion 65 and the first transmission portion 61 makes the transmitted light incident on the first reflection portion 65 positioned at a paraxial region.

Since the objective lens 60 having the aforementioned configuration has a large focusing power, near-field recording and/or reproducing is allowed.

The tracking mirror 50 disposed on the light path between the light path changing means and the objective lens 60, reflects the light from the light source 30 toward the recording medium 20. In the tracking mirror 50, the tilt thereof is delicately adjusted by tilt adjusting means (not shown) so that the light spot formed by the light reflected therefrom and focused on the recording medium 20 traces proper track positions of the recording medium 20.

The lens unit includes a collimating lens 35 disposed on the light path between the light source 30 and the light path changing means, and a relay lens 55 disposed on the light path between the tracking mirror 50 and the objective lens 60.

Here, the collimating lens 35 and the relay lens 55 preferably have a telescopic configuration. In this case, the objective lens 60 corresponds to an ocular lens of a telescope.

Thus, the light emitted from the light source 30 is focused by the collimating lens 35 to then be condensed at a focus f, and is then spread out to be incident on the relay lens 55. The relay lens 55 collimates the incident divergent light.

By providing the lens unit in the above-described manner, the traveling direction of the light is controlled by the tracking mirror 50 so that, even if the light deviates from the light axis c as indicated by dotted lines in FIG. 2, the light is collimated by the relay lens 55 and is refracted toward the light axis c, to then be incident on the incidence region of the objective lens 60, that is, the first transmission portion 61, thereby preventing vegnetting.

Here, the collimating lens 35 may be disposed between the light path changing means and the tracking mirror 50 or between the tracking mirror 50 and the objective lens 60. Also, the lens unit may be constituted by two or more lenses.

An optical pickup device according to an embodiment of the present invention includes a partial polarizing beam splitter (PPBS) 40 for transmitting and reflecting in a predetermined ratio incident light having a certain polarization, and transmitting or reflecting the other polarized incident light components. Here, on the light path between the PPBS 40 and the photo detecting unit 80, there may be provided a means for separating the light reflected from the recording medium 20 through the objective lens 60 and the PPBS 40 according to polarization, for example, a polarization prism 70.

The PPBS 40, for example, transmits about 70% of P polarized light and totally reflects S polarized light, among the incident light rays from the light source 30. Also, the PPBS 40 reflects about 30% of P polarized light and totally reflects S polarized light, among the light reflected from the recording medium 20.

Thus, the light incident on the recording medium 20 via the PPBS 40 is P polarized light, and both P polarized light and S polarized light may exist in the light reflected from the recording medium 20, which may be a magneto-optical disk, according to the information recorded on the recording medium 20.

The polarization prism 70 separates the incident light which has been reflected from the recording medium 20 and then has passed through the objective lens 60 and the PPBS 40 into P polarized light and S polarized light.

Figure 3:
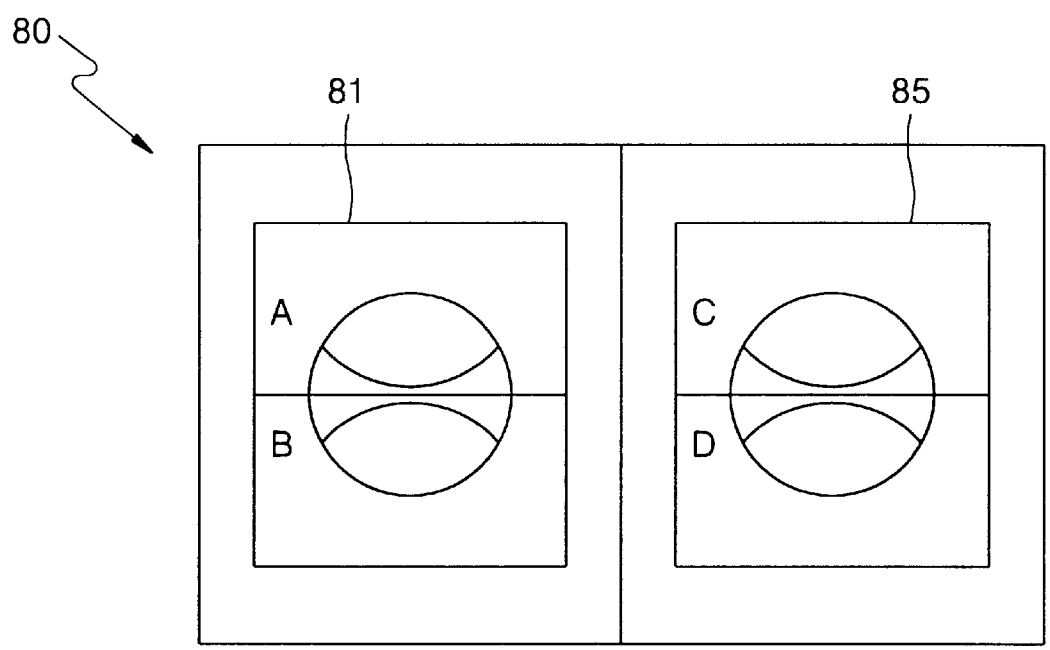
FIG. 3 is a plan view schematically illustrating a photo detecting unit shown in FIG. 2.

The photo detecting unit 80, as shown in FIG. 3, includes first and second photodetectors 81 and 85 for detecting a P polarized light signal and an S polarized light signal, separated by the polarization prism 70. Here, the first and second photo detectors 81 and 85 are divided into a plurality of sections each of which photoelectrically convert incident light independently.

A track error signal is detected by a push-pull method in which a difference between detection signals of the respective divided segments A/B and C/D of the first and/or second photo detectors 81 and/or 85 is obtained. An information signal is detected by comparing detection signals of the first and second photodetectors 81 and 85. Here, the principle of detecting a track error signal and an information signal using the detection signals of the respective photo detectors 81 and 85 is the same as known methods, and a detailed explanation thereof will be omitted.

In the above-described optical pickup device for recording on and/or reproducing from the magneto-optical recording medium 20, on a plane of the objective lens 60 facing the recording medium 20 or under the recording medium 20 is preferably further provided a magnetic field generating device (not shown) for generating a magnetic signal in a state where laser light is radiated from the light source 30 and recording information on the recording medium 20. Also, in the case of recording on/reproducing from the magneto-optical recording medium 20 based on an optical modulation method in which a magnetized state is changed by optical modulation and an information signal is recorded on the recording medium 20, the information signal can be recorded without the magnetic field generating device.

The aforementioned optical pickup device according to an embodiment of the present invention operates as follows.

First, the divergent light emitted from the light source 30 is changed into focused light by means of the collimating lens 35, and is then incident on the PPBS 40. Among the incident focused light rays, about 70% of the P polarized light is transmitted through the PPBS 40 and about 30% thereof is reflected. S polarized light is totally reflected.

The P polarized light transmitted through the PPBS 40 is reflected from the tracking mirror 50, converged to the focus f and then diverged to then be incident on the relay lens 55. The incident light is substantially collimated by the relay lens 55 to then be incident on the incidence region of the objective lens 60, that is, the first transmission portion 61. Also, as indicated by dotted lines shown in FIG. 2, even if the traveling direction of the light deviates from the optical axis c due to rotation of the tracking mirror 50, the incident light is collimated by the relay lens 55 and is simultaneously refracted to then be incident on the incidence region of the objective lens 60.

The incident light is spread out through the first transmission portion 61, which is then partially directed to the second transmission portion 63 and mostly directed to the first reflection portion 65. The light incident on the first reflection portion 65 is reflected to be directed to the second reflection portion 67 and then further reflected from the second reflection portion 67 and focused to then be directed to the second transmission portion 63. Thus, the light incident on the objective lens 60 via the first transmission portion 61 passes through the second transmission portion 63 to then be focused on the recording medium 20.

The light reflected from the recording medium 20 is incident on the second transmission portion 63 and then emitted through the first transmission portion 61 in the reverse of the above-described procedure. The emitted light is incident on the PPBS 40 via the relay lens 55 and the tracking mirror 50. Among the incident light rays, about 70% of the P polarized light is transmitted through the PPBS 40 and about 30% of the P polarized light and all of the S polarized light are reflected from the PPBS 40 and then separated by the polarization prism 70 to be focused by a receiving lens 75 and received at the photo detecting unit 80.

Here, the photo detecting unit 80 detects an information signal and a track error signal during reproduction, and detects only the track error signal during recording.

Figure 4:
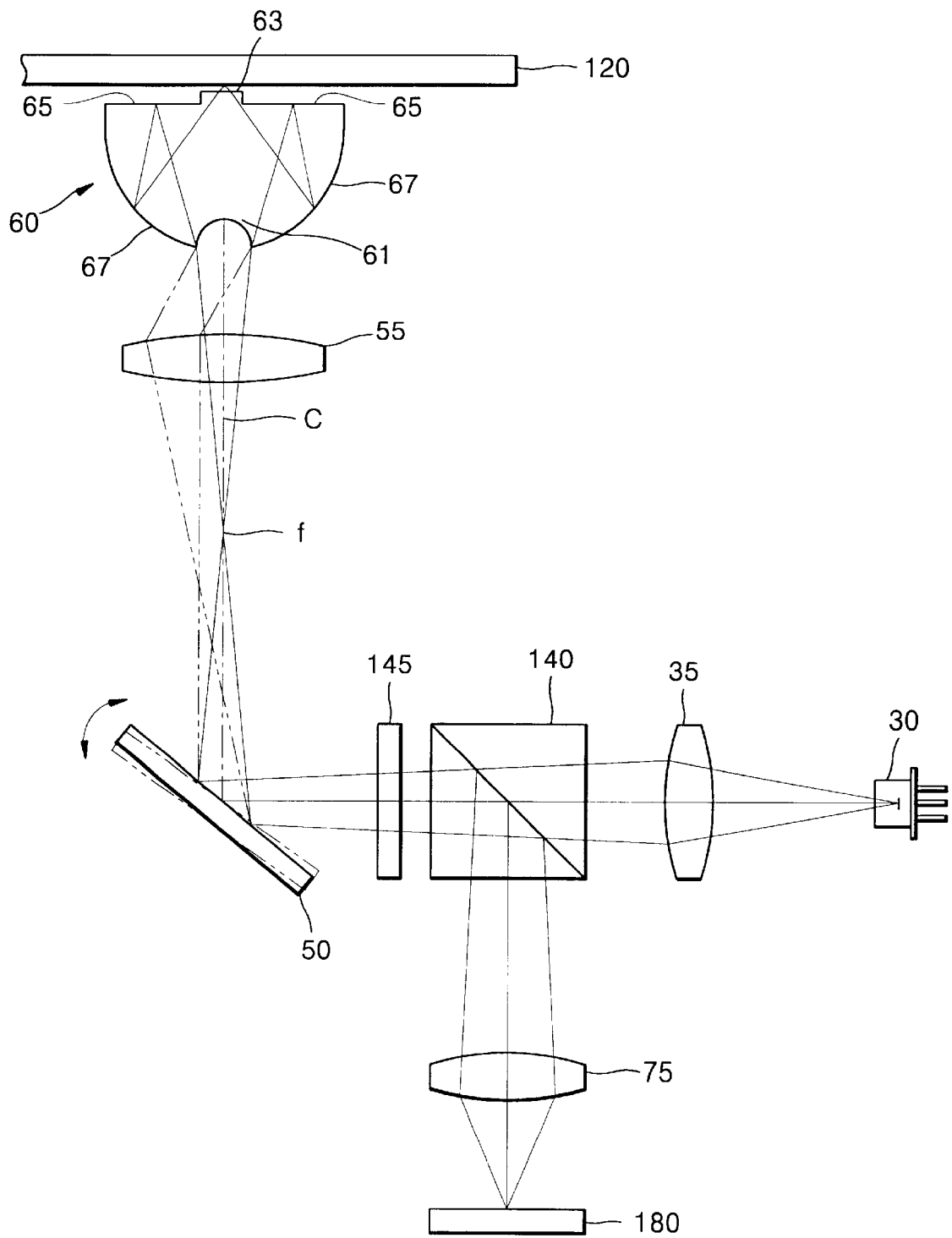
FIG. 4 is a schematic view illustrating the optical arrangement of an optical pickup device according to a second embodiment of the present invention.

FIG. 4 schematically shows an optical pickup device according to a second embodiment of the present invention. Here, the same reference numerals as those shown in FIG. 2 denote the same elements, and a detailed explanation thereof will not be given. The optical pickup device according to a second embodiment of the present invention, suitable for recording on and/or reproducing from an optical disk type recording medium 120 such as a phase-shift optical disk, is characterized by a polarization beam splitter 140 for transmitting or reflecting incident light according to the polarized state, and a wave plate 145 disposed on the light path between the polarization beam splitter 140 and the objective lens 60, for changing the polarized state of incident light, that is, a quarter wave plate as a light path changing means.

Figure 5:
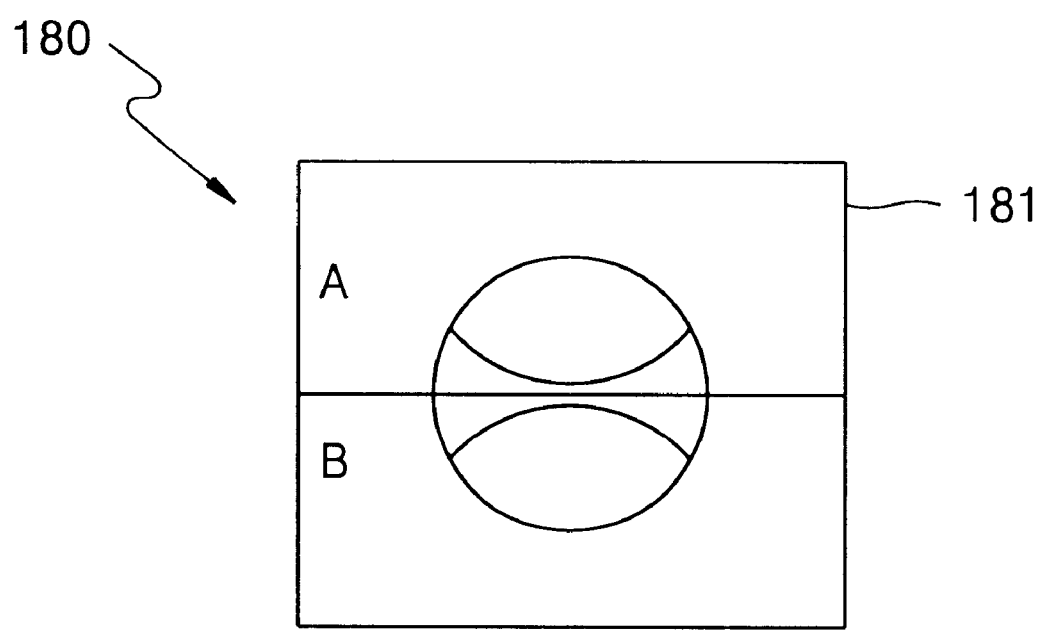
FIG. 5 is a plan view schematically illustrating the photo detecting unit shown in FIG. 4.

Here, as shown in FIG. 5, the photo detecting unit 180 includes a single photo detector 181 consisting of a plurality of sectioned plates for performing photo-electrical conversion independently.

The light source 30 may be configured to emit light of different wavelengths during recording and during reproduction. In this case, the wave plate 145 is preferably a quarter wave plate with respect to light in the wavelength region used for recording.

In the above-described optical pickup device according to a second embodiment of the present invention, among light rays emitted from the light source 30, a polarized light component such as P-polarized light is transmitted through the polarization beam splitter 140 and the other polarized light component such as S-polarized light is reflected from the polarization beam splitter 140. The transmitted light is changed into a circularly polarized beam by the wave plate 145, reflected from the recording medium 120, changed into the opposite circularly polarized beam is and is then incident on the wave plate 145. Then, the light is changed into the other polarized light component such as S-polarized light and reflected from the polarization beam splitter 140 to be directed toward the photo detector 181.

The above-described optical pickup device according to the present invention performs tracking by adjusting the reflection direction of incident light by means of a tracking mirror with an objective lens fixed, unlike the conventional optical pickup device which performs tracking by moving an objective lens laterally. Thus, a track error signal offset due to movement of the objective lens is not generated, thereby enabling stable tracking.

Also, the optical pickup device according to the present invention employs an objective lens configured to allow near field recording and/or reproducing and includes a collimating lens and a relay lens having a telescopic configuration. Thus, even if light deviates from an optical axis due to tracking by a tracking mirror, the light is refracted by the relay lens so as to be incident on an incidence region of the objective lens, thereby preventing vegnetting.

What is claimed is:

1. An optical pickup device comprising:

a light source for generating light;

an objective lens for focusing incident light to form a light spot on a recording medium and having an incidence region of a predetermined size;

a tracking mirror disposed on the light path between the light source and the objective lens, for reflecting incident light emitted from the light source so that the light spot traces proper track positions of the recording medium;

a lens unit including at least two lenses which allow the light reflected from the tracking mirror to be incident on the incidence region of the objective lens; and a photo detecting unit for receiving light reflected from the recording medium and having passed through the objective lens, wherein the objective lens comprises a first transmission portion forming the incidence region, for spreading incident light, a first reflection portion spaced a predetermined distance apart from the first transmission portion, for reflecting divergent incident light incident from the first transmission portion, a second reflection portion provided around the first transmission portion, for further reflecting the light reflected from the first reflection portion and focusing the same, and a second transmission portion provided at an interior or exterior side of the first reflection portion, for transmitting incident light to be focused on the recording medium.

2. An optical pickup device comprising:

a light source for generating light;

a light path changing means for changing the traveling path of incident light;

an objective lens for focusing incident light to form a light spot on a recording medium and having an incidence region of a predetermined size;

a tracking mirror disposed on the light path between the light source and the objective lens, for reflecting incident light emitted from the light source so that the light spot traces proper track positions of the recording medium;

a lens unit including at least two lenses which allow the light reflected from the tracking mirror to be incident on the incidence region of the objective lens;

a photo detecting unit for receiving light reflected from the recording medium and having passed through the objective lens; and a polarization prism for separating according to polarization incident light reflected from the recording medium and having passed through the objective lens and the light path changing means, the optical pickup device configured for recording on and/or reproducing from a magneto-optical recording medium such that the light path changing means comprises a partial polarized beam splitter for transmitting and reflecting a polarized light component in a predetermined ratio among incident light components and mostly transmitting or reflecting the other polarized light component, and such that the photo detecting unit comprises first and second photo detectors for receiving different polarized light components whose paths are changed by the partial polarized beam splitter and which are separated by the polarization prism.

3. An optical pickup device comprising:

a light source for generating light;

a light path changing means for changing the traveling path of incident light;

an objective lens for focusing incident light to form alight spot on a recording medium and having an incidence region of a predetermined size;

a tracking mirror disposed on the light path between the light source and the objective lens, for reflecting incident light emitted from the light source so that the light spot traces proper track positions of the recording medium;

a lens unit including at least two lenses which allow the light reflected from the tracking mirror to be incident on the incidence region of the objective lens;

a photo detecting unit for receiving light reflected from the recording medium and having passed through the objective lens, a polarization beam splitter for transmitting and reflecting incident light according to its polarization; and a wave plate disposed on the light path between the polarization beam splitter and the objective lens, for changing the polarization of the incident light.

4. An objective lens comprising:

a first transmission portion forming the incidence region, for spreading incident light, a first reflection portion spaced a predetermined distance apart from the first transmission portion, for reflecting divergent incident light incident from the first transmission portion, a second reflection portion provided around the first transmission portion, for further reflecting the light reflected from the first reflection portion and focusing the same, and a second transmission portion provided at an interior or exterior side of the first reflection portion, for transmitting incident light to be focused outside the objective lens.

5. An optical pickup device comprising:

a light source for generating light;

an objective lens for focusing incident light to form a light spot on a recording medium and having an incidence region of a predetermined size;

a tracking mirror disposed on the light path between the light source and the objective lens, for reflecting incident light emitted from the light source so that the light spot traces proper track positions of the recording medium without intervention of another reflective surface between said tracking mirror and said objective lens;

a lens unit including at least two lenses which allow the light reflected from the tracking mirror to be incident on the incidence region of the objective lens; and a photo detecting unit for receiving light reflected from the recording medium and having passed through the objective lens.

6. The optical pickup device according to claim 5, wherein the lens unit comprises a collimating lens disposed on the light path between the light source and the objective lens, for focusing incident light emitted from the light source, and a relay lens disposed on the light path between the collimating lens and the objective lens, for convergently refracting light reflected by the tracking mirror to be incident on the incidence region of the objective lens.

7. The optical pickup device according to claim 5, wherein the collimating lens and the relay lens are provided such that incident light is focused to a point and then allowed to diverge to be incident on the relay lens.

8. The optical pickup device according to claim 5, wherein the objective lens comprises a first transmission portion forming the incidence region, for spreading incident light, a first reflection portion spaced a predetermined distance apart from the first transmission portion, for reflecting divergent incident light incident from the first transmission portion, a second reflection portion provided around the first transmission portion, for further reflecting the light reflected from the first reflection portion and focusing the same, and a second transmission portion provided at an interior or exterior side of the first reflection portion, for transmitting incident light to be focused on the recording medium.

9. The optical pickup device according to claim 5, further comprising a polarization prism for separating according to polarization incident light reflected from the recording medium and having passed through the objective lens and the light path changing means, the optical pickup device configured for recording on and/or reproducing from a magneto-optical recording medium such that the light path changing means comprises a partial polarized beam splitter for transmitting and reflecting a polarized light component in a predetermined ratio among incident light components and mostly transmitting or reflecting the other polarized light component, and such that the photo detecting unit comprises first and second photo detectors for receiving different polarized light components whose paths are changed by the partial polarized beam splitter and which are separated by the polarization prism.

10. The optical pickup device according to claim 5, wherein the light path changing means comprises a polarization beam splitter for transmitting and reflecting incident light according to its polarization, and a wave plate disposed on the light path between the polarization beam splitter and the objective lens, for changing the polarization of the incident light.

* * * * *